United States Patent [19]
Farr

[11] Patent Number: 4,556,261
[45] Date of Patent: Dec. 3, 1985

[54] HYDRAULIC ANTI-SKID BRAKING SYSTEMS FOR VEHICLES

[75] Inventor: Glyn P. R. Farr, Warwickshire, England

[73] Assignee: Lucas Industries Public Limited Company, Birmingham, England

[21] Appl. No.: 542,358

[22] Filed: Oct. 17, 1983

[30] Foreign Application Priority Data

Oct. 21, 1982 [GB] United Kingdom ............... 8230101
Jan. 28, 1983 [GB] United Kingdom ............... 8302460

[51] Int. Cl.$^4$ .............................................. B60T 8/02
[52] U.S. Cl. ................................... 303/116; 303/119; 137/627.5
[58] Field of Search ............... 303/115, 116, 117, 119, 303/6 C, 6 A; 188/349, 181 A; 137/627.5

[56] References Cited

U.S. PATENT DOCUMENTS

| | | | |
|---|---|---|---|
| 3,747,990 | 7/1973 | Tanguy | 303/115 |
| 4,340,258 | 7/1982 | Farr | 303/115 |
| 4,350,396 | 9/1982 | Mortimer | 303/116 |
| 4,395,073 | 7/1983 | Arikawa et al. | 303/116 |

FOREIGN PATENT DOCUMENTS

| | | | |
|---|---|---|---|
| 0065451 | 11/1982 | European Pat. Off. | 119/ |
| 2079389 | 1/1982 | United Kingdom | 303/116 |
| 2090929 | 7/1982 | United Kingdom | 303/115 |

Primary Examiner—Duane A. Reger
Assistant Examiner—Alvin Oberley
Attorney, Agent, or Firm—Laff, Whitesel, Conte & Saret

[57] ABSTRACT

In an hydraulic anti-skid braking systems for vehicles, for example motor cycles or light passenger cars, a supply of operating fluid from a supply to a vehicle brake is modulated in accordance with skid signals from a skid sensing devices suitably an opto-sensor, which are electrical in nature, and an hydraulic pump incorporating at least one plunger working in a bore has a working chamber to control brake re-application following skid correction. The supply of fluid from the supply to the brake is modulated by a solenoid-operated valve assembly which is responsive to the skid signals, the valve assembly incorporating a normally-open isolating valve disposed between the source and the brake, and a normally closed dump valve disposed between the brake and a reservoir for fluid.

14 Claims, 7 Drawing Figures

HYDRAULIC ANTI-SKID BRAKING SYSTEMS FOR VEHICLES

This invention relates to hydraulic anti-skid braking systems for vehicles, for example motor cycles or light passenger cars, of the kind in which a supply of operating fluid from a supply to a vehicle brake is modulated in accordance with skid signals from skid sensing means, and an hydraulic pump incorporating at least one plunger working in a bore has a working chamber to control brake re-application following skid correction.

In some known anti-skid braking systems of the kind set forth the supply of fluid from the supply to the brake is modulated by a modulator assembly which comprise a piston, and an isolating valve which is operable by the piston, and a dump valve is normally closed to isolate the piston from a reservoir for fluid and trap a volume of fluid between the pump and the piston in order to hold the piston in an advanced position in which the isolating valve is open, the dump valve opening in response to a skid signal to release the trapped volume of fluid to the reservoir thereby permitting the piston to move into a retracted position to close the isolating valve and relieve the pressure of fluid applied to the brake. In such a known construction the skid sensing means may comprise a flywheel mechanism which is operable to open the dump valve by means of a mechanical connection.

Flywheel assemblies and associated modulator assemblies are relatively bulky and include a considerable number of components. This makes installation in a limited space difficult, and assembly time is relatively long in view of the number of components involved.

According to our invention in an anti-skid braking system of the kind set forth the skid signals are electrical in nature, and the supply of fluid from the supply to the brake is modulated by a solenoid-operated valve assembly which is responsive to the skid signals, the valve assembly incorporating a normally-open isolating valve disposed between the source and the brake, and a normally closed dump valve disposed between the brake and a reservoir for fluid.

The skid sensing means may comprise an opto-sensor and a remote controller operative to energise the solenoid in the event of a skid occuring whereafter the isolating valve is adapted to close to isolate the source from the brake and the dump valve is adapted to open to connect the brake to the reservoir, fluid, in a known manner, then being pumped in a closed circuit until the dump valve closes again following correction of the skid which permits re-application of the brake at a controlled rate until the isolating valve re-opens to re-connect the source to the brake.

Preferably the dump valve is normally held in a closed position by a spring, and the isolating valve is held open against its return spring, by means of a stronger, caged, spring.

Our invention provides a simplified construction in which the relatively long travel of the armature of the solenoid-operated valve is utilised to perform the dual task of opening the dump valve and of closing the isolating valve.

In one construction a single plunger working in a bore in a housing is urged in one direction by a cam on a drive shaft, and the working chamber controls brake re-application following skid correction and the restoration of the solenoid-operated valve assembly to its initial position at the termination of the skid signal. In such a construction the working chamber may control re-application of the brakes on one or more wheels of a vehicle in accordance with operation of the solenoid-operated valve assembly in response to skid signals from the, or one, braked wheel.

In another construction the drive shaft is provided with axially spaced cams to act on two or more separate pistons, and the pistons are associated with individual working chambers, each of which is adapted to control re-application of different brakes on one or more wheels of the vehicle in accordance with operation of individual corresponding solenoid-operated valve assemblies, each responsive to skid signals from the, or one, corresponding braked wheel.

When two cams are provided, conveniently the cams are relatively displaced angularly by 180° around the common shaft.

Providing separate assemblies of pumps and solenoid-operated valves enables us to control separately the behaviour of different wheels of a wheel, for example a front wheel and a diagonally opposite rear wheel, in accordance with skid signals from one of the wheels.

The two assemblies may be accommodated within a single common housing.

Some embodiments of our invention are illustrated in the accompanying drawings in which.

Figures 1, 2:
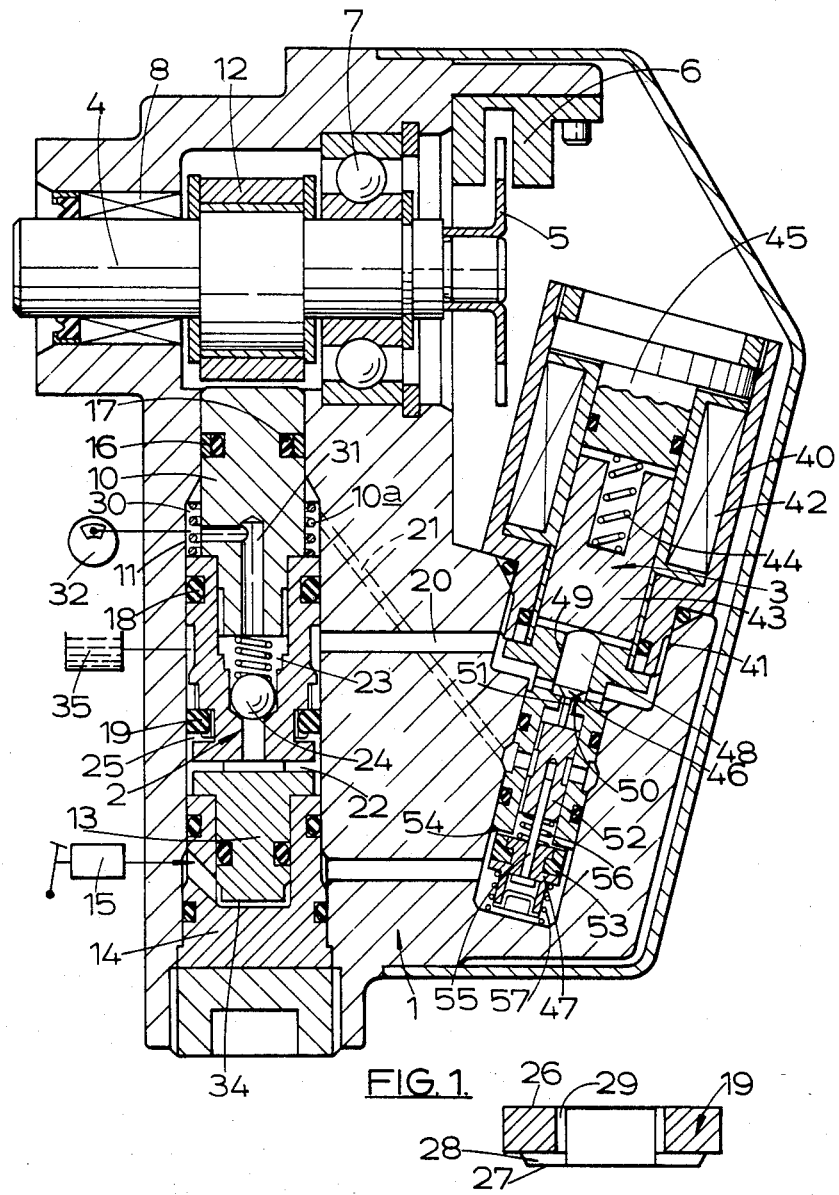
FIG. 1 is a section through a pump and skid sensing assembly for a vehicle hydraulic anti-skid braking system.
FIG. 2 is a section through a seal carried by the plunger of the pump.

The assembly illustrated in the drawings comprises a housing 1 incorporating an hydraulic pump 2, and a solenoid-operated valve assembly 3. A longitudinally extending shaft 4 projects at opposite ends from the housing and at one end carries a toothed disc 5 forming part of an opto-sensor 6 carried by the housing 1. The shaft 4 is journalled for rotation in spaced bearings 7 and 8 in the housing 1 and is driven from a front driven wheel of a vehicle.

The pump 2 comprises a plunger 10 of stepped outline which works in a stepped bore 11 in the housing 1 and the inner end of smaller area is engageable with a drive mechanism comprising a ring 12 which is freely rotatable on an eccentric portion of the shaft 4. At its end of greater area the plunger 10 is adapted to be engaged by a drive piston 13 working in the bore of sleeve 14 of cup-shaped outline which acts as a closure for the end of the bore 11 which is of greater area. The end of the drive piston 13 remote from the plunger 10 is exposed to the pressure in an hydraulic master cylinder 15 through a passage in the sleeve 14. The master cylinder 15 is of conventional hydrostatic construction and has its own reservoir (not shown) to replenish the pressure space in advance of its piston through a recuperation valve.

The inner end portion of the plunger 10, which is of smaller area, carries an annular sealing ring 16 backed by a seal 17, an 'O' ring seal 18 and a lip seal 19. The seals 18 and 19 are disposed on opposite sides of a passage 20 leading to the solenoid-operated valve 3, irrespective of the position of the plunger 10 within the bore 11, and the seal 16 and the adjacent 'O' ring seal 18 are also disposed on opposite sides of a passage 21 leading to the solenoid-operated valve 3. A secondary working chamber 22 is defined by the annular volume bounded by the bore 11, the plunger 10, the seal 18 and the seal 19.

A primary working chamber 23 is defined in the plunger 10 between a first one-way valve 24 in the plunger 10, the drive piston 13, and a second one-way valve constituted by the seal 19.

The seal 19, which is illustrated in detail in FIG. 2, comprises an annular ring of elastomeric material which is received in an annular groove 25 in the plunger 10. The groove 25 is parallel sided and is of an axial length greater than the thickness of the ring 19. Opposite faces 26 and 27 of the ring are respectively planar and of reduced area, with the face 27 of reduced area being provided with at least one diametrical slot 28 which communicates with passages 29 in the inner peripheral edge of the ring 19. The planar face 26 is adapted to seal against the adjacent, inner, face of the groove 25 to prevent flow from the secondary chamber 22 into the primary chamber 23.

The passage 21 leads into an annular outlet chamber 30 defined between the steps in diameters of the plunger 10 and the bore 11, between the seals 16 and 18. The chamber 30 is in open communication with the working chamber 23 through connecting passages 31 in the plunger 10, and the chamber 30 is also connected to a brake 32.

The solenoid-operated valve assembly 3 comprises a stepped body 40 which is received at its inner end in a stepped bore 41 in the housing 1. A coil 42 which is adapted to be energised by electrical signals generated by a controller in response to skid signals from the opto-sensor 6, is housed in the body 40 and an armature 43 movable axially in response to energisation of the coil 41 is normally urged inwardly by means of a spring 44 which abuts against a plug 45 at the outer end of the body 40. The armature 43 is adapted to control operation of a dump valve 46 and of an isolating valve 47.

The dump valve 46 comprises a valve head 48 which is guided to slide in a bore 49 in the body 40. The armature 43 acts on one end of the head 48 normally to urge the opposite end into engagement with a seating 50 to isolate the brake 32 from a reservoir 35 by closing off the passage 20. In this position the head 48 acts through a reduced diameter strut 51, passing through the seating 50, and an enlarged head 52 in order to hold the isolating valve 47 in an open position so that the master cylinder 15 is in communication with the brake 32 through a chamber 34, to which the drive piston 13 is exposed, and the passage 21.

The isolating valve 47 comprises a head 53 for engagement with a seating 54 defined by a face at the inner end of the body 40, and the head 53 is supported by a stem 55 which is guided to slide in a bore in the head 52 to form a lost-motion connection therebetween. Normally, in the position shown, the head 53 is held away from the seating 54 by means of a caged spring 56 which abuts between adjacent ends of the heads 52 and 53 and acts against the force in a weaker return spring 57.

In a normal inoperative "brakes-off" position shown in the drawing the armature 43 is urged into an advanced position by the spring 44 to hold the dump valve 46 closed and the isolating valve 47 open. The plunger 10 is retained in an inoperative, retracted, position by means of a spring 10a.

When the brake 32 is to be applied fluid from the master cylinder 15 is supplied to the brake 32 through the chamber 34, the open isolating valve 47, the passage 21 and the chamber 30. The pressure also acts against the drive piston 13 to tend to urge it, and the pump plunger 10, towards the ring 12. However this is opposed by the fluid pressure in the chamber 30 acting over a shoulder at the step in diameter of the piston which is of greater area than that of the drive piston 13. Thus the drive piston 13 is held against a stop defined by the inner end of the sleeve 14 and the pump 2 remains stalled or disabled.

If the angular deceleration of the braked wheel exceeds a predetermined value, a skid signal is produced and the coil 42 is energised to withdraw the armature 43 against the force in the spring 44. In sequence this opens the dump valve 46 to connect the brake 32 to the reservoir 35, and permits the isolating valve 47 to close under the load in the spring 57. This results in the reduction of the brake-applying pressure, and the isolation of the master cylinder 15 from the brake 32, respectively.

The release of fluid-pressure from the chamber 30 causes the plunger 10 to become unbalanced and the pressure from the master cylinder 15 is sufficient to drive the drive piston 13 and the plunger 10 relatively towards the ring 12. Thus the plunger 10 is reciprocated in the bore 11 by the ring 12 which, in turn, is oscillated by rotation of the shaft 4.

As the plunger 10 is moved towards the ring 12, fluid from the reservoir 35 is drawn into the increasing volume of the chamber 22 past the seal 19 with flow taking place through the passages 28 and 29, and fluid is pumped from the chamber 30 into the passage 21, since the first one-way valve 24 is closed, and from whence it is returned to the reservoir 35 through the still open dump valve 46. As the plunger 10 is moved in the opposite direction the face 26 of the seal 19 seals against the adjacent face of the groove 25 so that fluid is displaced from the chamber 22, and into the chamber 23, through the first one-way valve 24, which opens.

Whilst the dump valve 46 remains open fluid is pumped by the pump 2 in a closed circuit from the reservoir 35, to which it is returned.

At the termination of the skid signal, the spring 44 urges the armature axially to close the dump valve 46 thereby isolating the pump 2 and the brake 32 from the reservoir 35. The isolating valve 47 remains shut and is prevented from opening by the pressure from the master cylinder 15 which acts to hold the head 53 against the seating 54, with movement of the armature 43 relative to the head 47 being accommodated by the lost-motion connection comprising the clearance between the stem 55 and the bore in the head 52.

The pump 2 continues to operate and, due to closure of the dump valve 46, the pressure from the pump 2 increases and that pressure is applied to the brake 32 at a controlled rate until the pressure either causes another skid or becomes substantially equal to the output pressure from the master cylinder 15.

In the former case the cycle described above will be repeated to relieve the pressure applied to the brake 32 until a similar stage in the cycle is again attained.

In the latter case, when substantially equal pressures are applied to opposite sides of the head 53, since the spring 56 is stronger than the spring 57, the isolating valve 47 will open to re-connect the master cylinder 15 to the brake 32. The pump 2 is again stalled at T.D.C. or disabled as described above, with the plunger 10 being held away from the ring 12 by the fluid-pressure acting over the annular area of the chamber 30.

When the brake is released with the isolating valve 47 in a closed position, the isolating valve 47 will open substantially upon release of the pressure from the master cylinder 15 and the spring 10a will return the piston 10 to its stop.

In the construction described above the isolating valve 47 remains closed and a source separate from the master cylinder 15, namely the pump 2, is cycled to re-apply the brake 32 at a controlled rate.

The system described above may be provided with a "hold" feature to ensure that the dump valve 46 can open only when a skid is genuine.

This can be achieved by giving the solenoid a cycle of 10 ms to permit the isolating valve 47 to close but prevent a full reduction in brake pressure. Once this cycle has been completed the brake 32 is re-applied at a rate determined by the pump 2. If the skid signal persists indicating that the skid is genuine then the dump valve 46 re-opens to relieve the brake-pressure.

Figure 3:
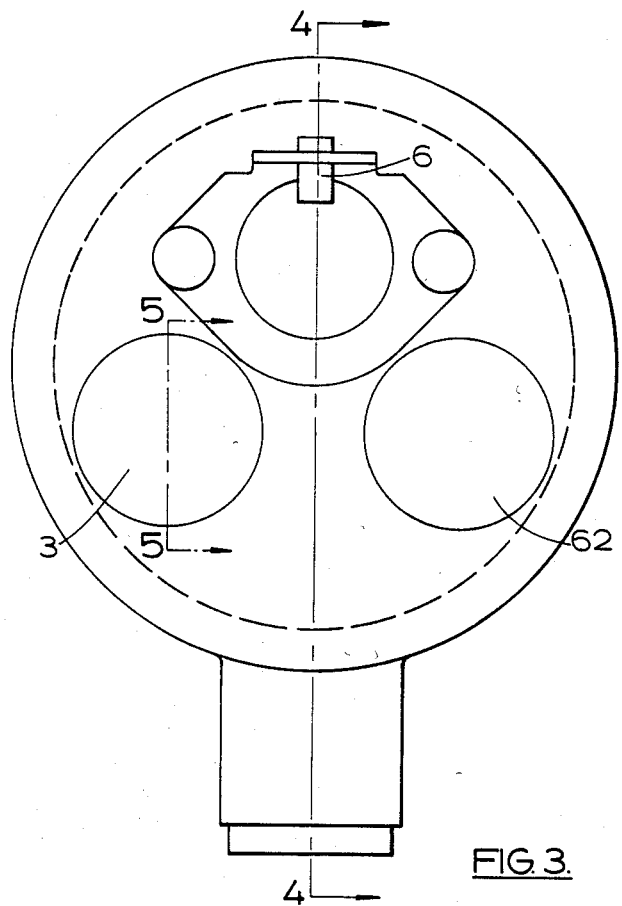
FIG. 3 is an end view of a modified pump and skid sensing assembly.
Figure 5:
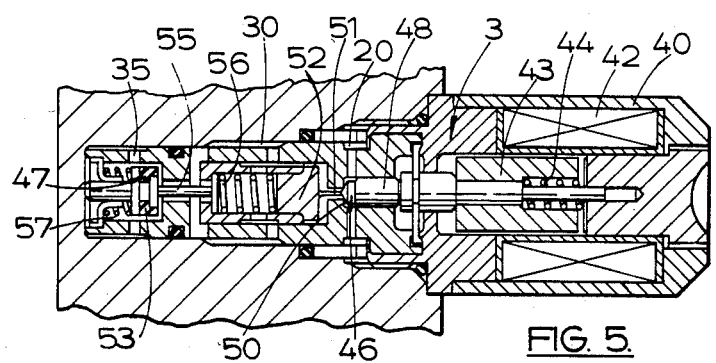
FIG. 5 is a section on the line 5—5.
Figure 4:
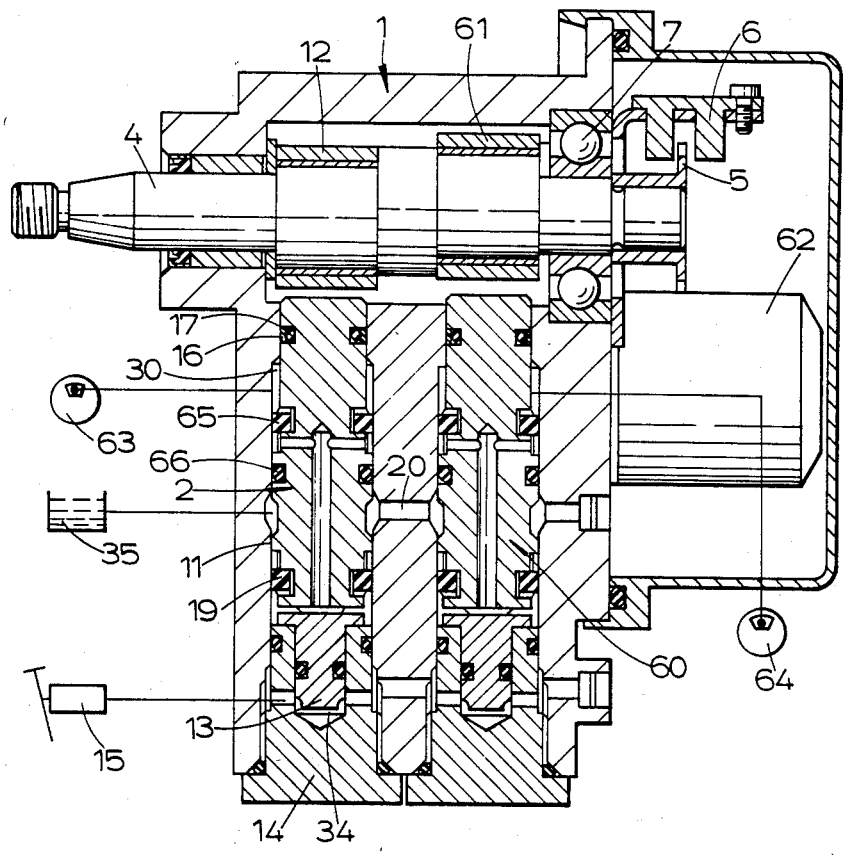
FIG. 4 is a section on the line 4—4 of FIG. 3.

In the assembly illustrated in FIGS. 3-5, a second pump 60 is housed in the housing 1 in a position spaced axially from the pump 2. The shaft 4 is provided with a second drive mechanism comprising a ring 61 freely rotatable on a second eccentric portion on the shaft which is displaced angularly by 180° from the other eccentric portion. The two pumps 2 and 60 are similar in construction and reference numerals have therefore not been applied to the pump 60 for clarity.

A second solenoid-operated valve assembly 62 similar to the assembly 3 is provided for association with the pump 60.

The pressure from the master cylinder 15 acts on both pistons 13, the reservoir 35 is connected to both pumps 2 and 60, and the separate outlet chambers 30 are connected to the brakes 63, 64 on different wheels of a vehicle.

Although we illustrate both pistons 13 being exposed to pressure from a common pressure space of a master cylinder 15, in a modification the pistons 13 could be exposed to pressure from different pressure sources of a tandem or dual master cylinder.

The opto-sensor 6 normally senses the behaviour of the wheel from which the shaft 4 is driven, for example a front wheel of a front wheel driven vehicle, and the skid signal from that sensor operates the solenoid-operated valve 3. In another construction the opto-sensor 6 could simply warn of failure in the drive to the assembly, and need not operate the solenoid. In such a case the solenoid will be operated from an independent wheel speed sensor.

The solenoid-operated valve assembly 62 is operated by a signal from another wheel at the vehicle, suitably the diagonally opposite rear wheel.

When skid signals are received from either sensor the respective solenoid-operated valve assembly 3 or 62 is operated as described above with reference to FIGS. 1 and 2 to control the behaviour of the wheel, independently of the behaviour of the other wheel included in that brake-applying circuit.

The shaft 4 may be driven from a front wheel of the vehicle, or from the output shaft from the gear-box.

If a vehicle is aqua-planing at fast speed on a very wet surface, when the shaft 4 is driven from a front wheel, the further re-application of brake on the rear wheel will be delayed until the wheel has passed onto a good surface so that rotation of the front wheel can re-commence.

In the assembly described above with reference to FIGS. 3-5, the one-way valve 24 in the piston of each pump 2, 60 is replaced by a second seal 65 in back-to-back relationship with the seal 18 to permit fluid to be displaced to the respective brake 63, 64 as the respective piston is urged inwardly by the respective drive 12, 61. The 'O' ring seal 18 is replaced by a seal 66 which is subjected on opposite faces to the output pressure to the brake and from the reservoir.

The construction and operation of the assembly of FIGS. 3-5 is otherwise the same as that of FIGS. 1 and 2 and corresponding reference numerals have been applied to corresponding parts.

In another construction the shaft may be provided with more than two cams each for operating a different piston, and the cams are equally spaced angularly with respect to the axis of the shaft.

Figure 6:
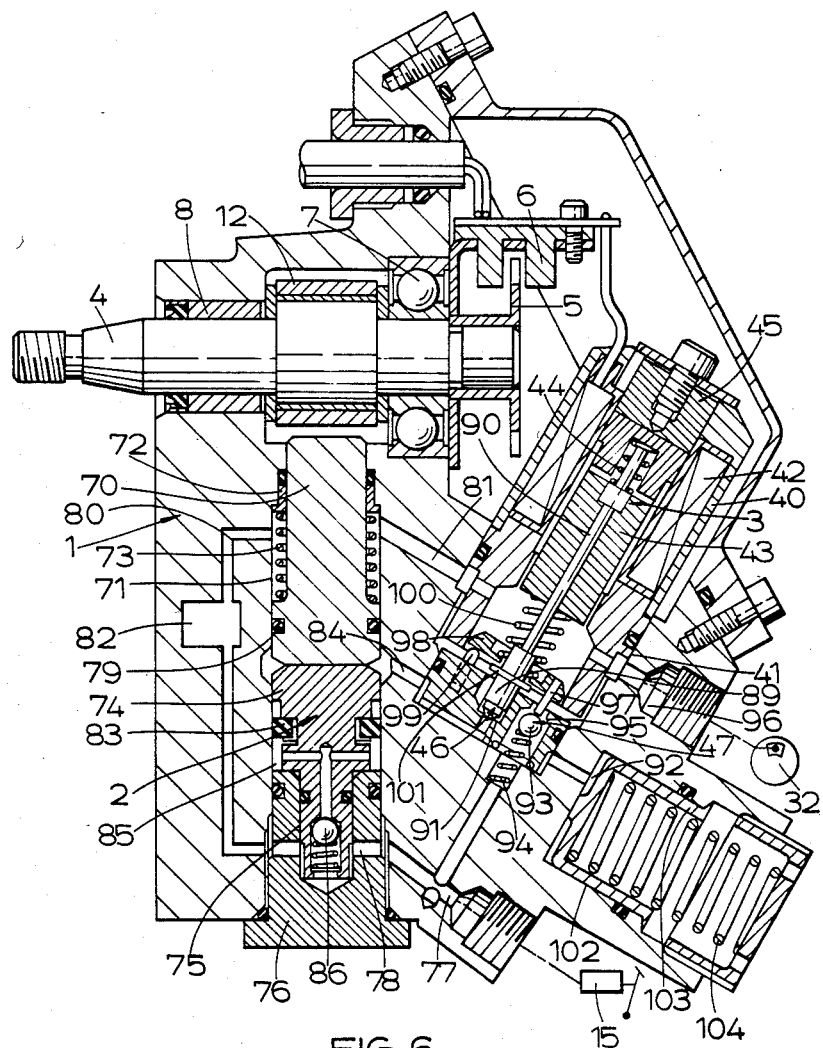
FIG. 6 is a section similar to FIG. 1 of another dump and skid sensing assembly.

In the assembly illustrated in FIG. 6 of the drawings the pump 2 comprises an imperforate tappet 70 of stepped outline which works in a stepped bore 71 in the housing 1 and the inner end of the tappet 79, which is of smaller area, projects through a seal 72 adjacent to the inner end of the bore 71 for engagement with the ring 12. A spring 73 acts normally to bias the tappet 70 away from the ring 12. At its end of greater area the tappet 10 is adapted to be engaged by a pump plunger 74 of stepped outline. The plunger 74 works in a stepped bore defined by a portion of the bore 71 which is of greater diameter, and a blind bore 75 of a sleeve 76 of cup-shaped outline which acts as a closure for that end of the bore 71. The end of the plunger 74 which is of smaller area is exposed to the pressure in the master cylinder 15 through a passage 77 in the housing and a passage 78 in the sleeve 76.

The seal 72 and a seal 79 carried by the tappet 70 are disposed at all times on opposite sides of diametrically opposed passages 80 and 81 leading respectively from the passage 78 through a flow control valve 82 in the housing 1 and to the solenoid-operated valve assembly 3. The seal 79 and a seal 83 carried by the plunger 74 are disposed at all times on opposite sides of a passage 84 which also leads to the solenoid-operated valve 3.

The flow control valve 82 is constructed and arranged to increase restriction with increase in the pressure drop acting across it. Conveniently the flow control valve may be of the kind covered by GB-A-2045372.

The seal 83 is of similar construction and acts in a similar manner to that illustrated in FIG. 2 and described above. That is to say the seal 83 acts as a one-way valve to permit fluid to be drawn from the passage 84 and into a primary working chamber 85 defined in the bore 71 between the seal 83 and the sleeve 76 upon movement of the plunger 74 away from the sleeve 76, from whence it is displaced, through a one-way valve 86 in the plunger 74, into the passage 78 upon movement of the plunger 74 in the opposite direction.

The dump valve 46 comprises a head 89 at the free end of a stem 90, which is guided to slide in a bore in the armature 43, and the head 89 is engagable with a seating 91 in the housing 1 to isolate the passage 4 from a reservoir 92 for fluid.

The isolating valve 47 comprises a valve member 93 which is urged by a spring 94 towards a seating 95 disposed between the passage 77 and an outlet passage 96 leading to the brake 32 and in open communication at all times with the passage 81. The valve member 93 is normally urged away from the seating 95 by a probe 97 on an operating member 98 which rocks abut a fulcrum 99 and upon which acts a compression spring 100 to urge it against a stop abutment 101 on the valve head 89.

The reservoir 92 comprises a dump chamber in the housing 1 defined between the inner end of a bore 102 and a hollow piston 103 which is urged towards the inner end of the bore 102 by means of a light spring 104.

In a normal inoperative "brakes-off" position shown in the drawing the armature 43 is urged into an advanced position by the spring 44 to hold the dump valve 46 closed, and the spring 100 acts on the member 98 to hold it against the abutment 101, in which position the isolating valve is held open. The plunger 74 and the tappet 70 are held in inoperative, retracted positions by the spring 73 and the friction in the seals 72, 79 and 83.

When the brake 32 is to be applied, fluid from the master cylinder 15 is supplied to the brake 32 through the passage 77 and the open isolating valve 47. The pressure also acts on the end of the plunger 74, which is of smaller area, to tend to urge it, and the tappet 70, towards the ring 12. However this is opposed by the pressure applied to the brake 32 and in the passage 81 which acts over the shoulder at the step in diameter of the tappet 70. Since this is of a greater area that the end of the plunger 74 which is of smaller area, the plunger 74 is held against a stop defined by the inner end of the sleeve 76 and the pump 2 remains stable or disabled.

If the angular deceleration of the braked wheel exceeds a predetermined value, a skid signal is produced and the coil 42 is energised to withdraw the armature 43 against the force in the spring 44. In sequence this withdraws the head 89 from the seating 91 to open the dump valve 46. During this movement of the head 89, the member 98 rocks about its fulcrum 99 subsequently to permit the valve member 93 to engage with the seating 95, thereby permitting the isolating valve 47 to close under the load in the spring 94. This results in the reduction of the brake-applying pressure by the release of fluid from the brake 32 to the reservoir 92, and the isolation of the master cylinder 15 from the brake 32, respectively.

Opening the dump valve 46 also causes the release of fluid from the passage 81 which causes a substantial pressure drop across the flow control valve 82 thereby restricting flow through it, and causes the tappet 70 and the plunger 74 to become unbalanced. The pressure from the master cylinder 15 can then urge the plunger 74 and the tappet 70 relatively away from the sleeve 76 to cause the tappet 70 to engage the ring 12. The tappet 70 and the plunger 74 are both reciprocated in their respective bores by the ring 12.

Whilst the dump valve 46 remains open and as the plunger 74 is reciprocated, fluid is withdrawn from the reservoir 92 and is pumped in a closed circuit back to the reservoir 92 through the passage 77.

At the termination of the skid signal, the spring 44 urges the armature axially to close the dump valve 46 thereby isolating the pump 2 and the brake 32 from the reservoir 92.

The isolating valve 47 remains shut and is prevented from opening by the pressure of the master cylinder 15 acting on the valve member 93 which, together with the force in the spring 94, is greater than the force in the spring 100 which acts on the valve member 93 through the member 98.

The pump 2 continues to operate and, due to the closure of the dump valve 46, the pressure from the pump 2 increases and that pressure is applied to the brake through the flow control valve 82 at a controlled rate determined by the setting of the flow control valve 82. Thus the pressure applied to the brake increases with relative increase in the pressure from the pump 2 and relative decrease in the pressure drop across the flow control valve 82. This continues until the increased pressure applied to the brake 32 either causes another skid, or becomes substantially equal to the output pressure from the master cylinder 15.

In the former case the cycle described above will be repeated to relieve the pressure applied to the brake 32 until a similar stage in the cycle is again attained.

In the latter case, when substantially equal pressures are applied to opposite faces of the valve member 93, since the spring 100 is slightly stronger than the spring 94, the isolating valve 47 will open to re-connect the master cylinder 15 to the brake 32. The pump 2 is again stalled or disabled as described above.

The provision of the reservoir 92 as a dump or expansion chamber ensures that fluid cannot be exhausted from the system as may occur in the construction of FIGS. 1 and 2, and FIGS. 3 and 4, where no fluid is available to replenish the master cylinder 15. For example, in the constructions of FIGS. 1 and 2, and FIGS. 3 and 4, which include an "atmospheric" reservoir 32, continuous cycling of the master cylinder to achieve intermittent brake application and release, generally known as "cadence braking" may exhaust all the fluid from the reservoir of the master cylinder 15. If the pump 2 is stalled, at that stage, fluid in the reservoir 35 is not available to replenish the master cylinder 15.

In the assembly of FIG. 6 the piston 103 prevents fluid from escaping from the system so that said fluid is always available to replenish the pressure space of the master cylinder 15 if necessary.

The construction and operation of the assembly of FIG. 6 is otherwise the same as those of FIGS. 1 and 2, and FIGS. 3 and 4, and corresponding reference numerals have been applied to corresponding parts.

Figure 7:
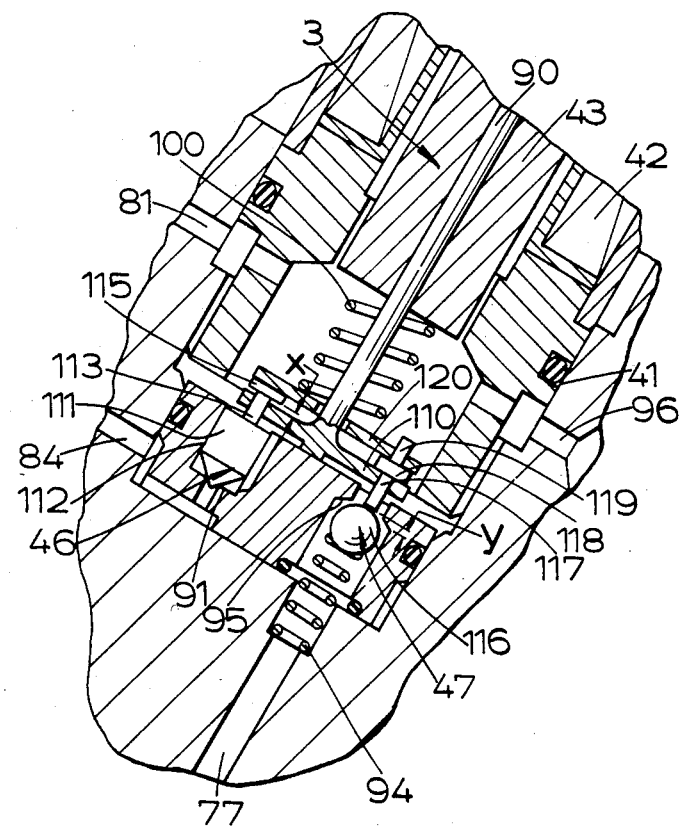
FIG. 7 is a section of a portion of the assembly of FIG. 6 but showing a modification.

FIG. 7 shows a modified construction of the dump valve 46 and the isolating valve 47.

As illustrated both valves 46 and 47 are spaced radially with respect to the axis of stem 90, and the stem 90 carries at its free end a cross-bar 110.

The dump valve 46 comprises a head 111 which is guided to slide in a bore 112 for engagement with the seating 91, and the head 111 is carried by a stem 113 which projects through an opening in the bar 110 and of which the free end is carried a head 115.

The isolating valve 47 comprises a valve member 116 which is urged by the spring 94 towards the seating 95. The valve member 116 is normally urged away from the seating 95 by a probe 117 which extends from one side of a head 118 through an opening in the bar 110, and a projection 119 projects from the opposite side of the head 118 towards the armature 43. The spring 100 acts on the heads 115 and 118 through a plate 120, and the projection 119 extends through an opening in the bar 120 to locate the probe 117 in position.

In the position shown the spring 100 holds the head 111 against the seating 91, and the probe 117 holds the valve member 116 away from the seating 95. The clearance "x" between the head 115 and the bar 110 is greater than the distance "y" comprising the clearance between the valve member 116 and the seating 95. When the solenoid is energised in response to a skid signal and the stem 90 is withdrawn, the probe 117 is withdrawn through a sufficient distance "y" for the valve member 116 to engage with the seating 95 before the bar 110 can move through the distance "x" to engage with the head 115. This ensures that the isolating valve 47 closes before the dump valve 46 can open.

We claim:

1. An hydraulic anti-skid braking system for vehicles comprising a brake for braking a wheel, a supply of operating fluid to apply said brake, a reservoir for fluid, skid sensing means for sensing the behaviour of said wheel and adapted to emit skid signals when said wheel attains a skid condition, said skid signals being electrical in nature, a solenoid-operated valve responsive to said skid signals and adapted to modulate the operating fluid from said supply to said brake in accordance with said skid signals, and an hydraulic pump incorporating at least one plunger working in a bore, and means defining a working chamber from which re-application fluid under pressure is supplied to said brake to control re-application of said brake following skid correction, said valve assembly incorporating an isolating valve disposed between said supply and said brake, a dump valve disposed between said brake and said reservoir, a coil energised in response to said skid signals, an armature surrounded by said coil, and a first spring biassing said armature in a first direction opposite a second direction in which said armature is moved when said coil is energised, wherein said dump valve comprises a first seating, and a first valve member for engagement with said first seating and urged towards said first seating by the force in said first spring acting through said armature, and wherein said isolating valve comprises a second seating spaced from said first seating, a second valve member for engagement with said second seating, and a second spring for urging said second valve member into engagement with said second seating, thrust transmitting means including a yieldable strut being disposed between said first and second valve members and through which a force from said first spring urging said first valve member into engagement with said first seating is transmitted to said second valve member to hold said second valve member away from said second seating, energisation of said coil moving said armature in said second direction against the force in said first spring to permit said first valve member to move away fron said first seating and open said dump valve and permit said second valve member to engage with said second seating under the force in said second spring and close said isolating valve, said yieldable strut yielding to permit said first valve member to move relative to said second valve member and close said dump valve when said coil is de-energised and said first spring urges said first valve member into engagement with said first seating, said isolating valve remaining closed until a pressure differential acting on opposite sides of said second valve member together with the force in said yielding strut exceeds the load in said second spring.

2. A system as claimed in claim 1, wherein means responsive to a skid signal is operative to energise said coil in the event of a skid occuring whereafter the isolating valve is adapted to move into said closed position to isolate said supply from said brake and said dump valve is adapted to move into said open position to connect said brake to said reservoir, said pump then being operative to pump fluid in a closed circuit until said dump valve moves into said closed position again following correction of said skid which permits re-application of the brake at a controlled rate until said isolating valve re-opens to re-connect said supply to said brake.

3. A system as claimed in claim 2, including a flow control valve through which said pump pumps fluid to re-apply said brake and which determines the said controlled rate of brake re-application.

4. A system as claimed in claim 1, wherein said skid sensing means comprises an opto-sensor and a remote controller operative to energise said coil.

5. A system as claimed in claim 1, wherein said first and second valve members are aligned axially and a lost-motion connection is provided between said valve members.

6. A system as claimed in claim 1, wherein said first and second valve members are relatively spaced radially and a rocking lever is incorporated for operating said valve member.

7. A system as claimed in claim 1, wherein both said first and second valve members are spaced radially with respect to the axis of said coil.

8. A system as claimed claim 1, wherein a cam is provided on a rotatable shaft driven from said wheel, and a single plunger working in a bore in a housing is urged in one direction by said cam, the working chamber controlling brake re-application following skid correction and the restoration of the solenoid-operated valve assembly to an initial position at the termination of said skid signal.

9. A system as claimed in claim 8, wherein said working chamber controls re-application of the brakes on one or more wheels of a vehicle in accordance with operation of said solenoid-operated valve assembly in response to skid signals from at least one, braked wheel.

10. A system as claimed in any of claim 1, wherein at least two axially spaced cams are provided on a rotatable shaft driven from said wheel, and corresponding pistons working in respective bores in a housing are urged in one direction by said respective cams, said pistons being associated with individual working chambers, each of which working chamber is adapted to control re-application of different brakes on one or more wheels of the vehicle in accordance with operation of individual corresponding solenoid-operated valve assemblies, each responsive to skid signals from at least one braked wheel.

11. A system as claimed in claim 10, wherein said cams are relatively displaced angularly by 180° around said shaft.

12. A system as claimed in claim 10, wherein separate assemblies of said pumps and said solenoid-operated valves are accommodated within a single common housing.

13. A system as claimed in claim 1, wherein said reservoir comprises an atmospheric reservoir.

14. A system as claimed in claim 1, wherein said reservoir comprises a chamber defined between a bore and a piston which is biassed by a light spring.

* * * * *